June 26, 1962 J. A. McINERNEY 3,040,773
COMBINED VALVE ACTUATING AND INDICATOR MECHANISM
Filed Sept. 4, 1959 4 Sheets-Sheet 3

Inventor.
John A. McInerney.

June 26, 1962
J. A. McINERNEY
3,040,773
COMBINED VALVE ACTUATING AND INDICATOR MECHANISM
Filed Sept. 4, 1959
4 Sheets-Sheet 4
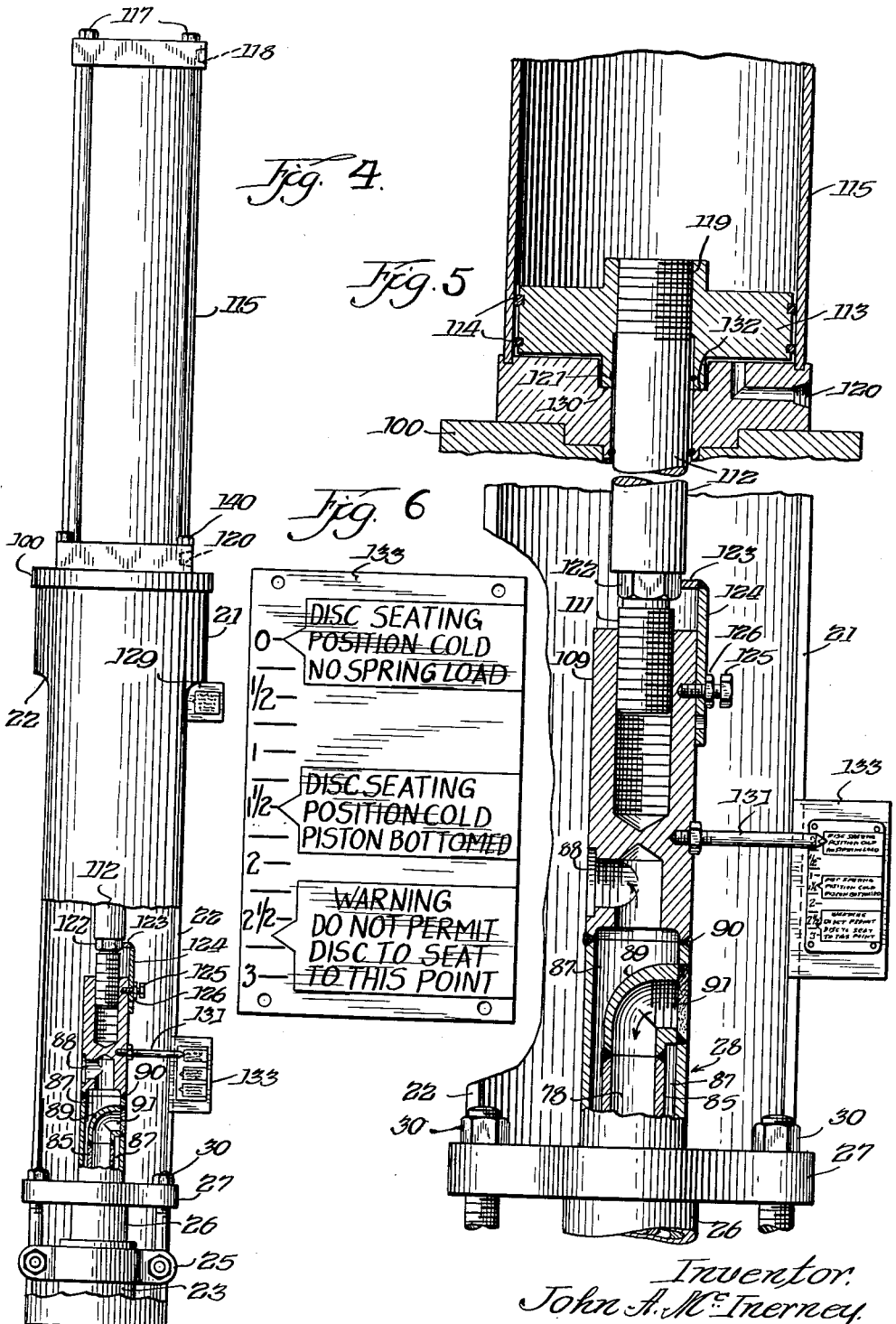
Inventor.
John A. McInerney.
By Joseph O. Lange
Atty.

United States Patent Office 3,040,773
Patented June 26, 1962

3,040,773
COMBINED VALVE ACTUATING AND
INDICATOR MECHANISM
John A. McInerney, Evergreen Park, Ill., assignor to Crane Co., Chicago, Ill., a corporation of Illinois
Filed Sept. 4, 1959, Ser. No. 838,161
6 Claims. (Cl. 137—556.3)

This invention relates generally to a valve actuating construction, and, more particularly, it is concerned with the type of valve actuating mechanism in which a relatively flexible reciprocally movable valve closure is employed, together with means for protecting said closure flexibility by suitable means for avoiding overloading to avoid damage to the closure member or to the valve seats, or both, all as hereinafter more clearly set forth.

At the outset, and in order to have a better understanding and appreciation of the background of this invention, it should be understood that valves of this general type are relatively large, say, of the order of 40" and larger, and are preferably fabricated and installed in field services of a comparatively severe character, not only insofar as the type of line fluid materials being carried is concerned, but also considering the excessively high temperatures and the nature of the fluids to which the valve is subjected.

Therefore, an important object is to provide for a flexible valve actuating construction in which the performance of the valve on pipe lines in which valve closing can be safely handled without objectionably affecting the valve seats or discs.

A further object is to provide for a valve actuating means particularly adaptable for use with a flexible gate valve closure member in which the movement of the closure member between its open and closed positions is not only easily and accurately obtained, but doing so preferably by visual means on the said valve actuating means conveniently and accurately manipulated by the personnel having control over the operation of such valve.

In the above connection, it must be understood that where a resilient and limitedly expansible disc or closure construction is used in a tapered or wedge gate valve, as in the instant case, accurate pre-loading is necessary in order to avoid either overloading of the closure member, or else, equally objectionable, providing insufficient seat loading in the fully seated position. Thus, as will hereinafter become clear, means for accurately controlling the stroke or the movement of the closure member between fully open and closed positions are provided in order to prevent such damage to the resilient gate valve closure member. Actual serious damage and permanent injury could arise from crushing or deforming the closure member in such cases where a seating overload takes place or else what is termed seat wire-drawing in the event that the valve closure member is not seated with the proper load in the valve closed position.

Another important object is to provide for a valve actuating means especially for use with a resilient valve closure member whereby positive protection is afforded insofar as damage to the valve closure member or to the valve body seats is concerned, and featuring a construction as will hereinafter be more readily understood whereby the fluid driven mechanism, such as the piston and cylinder, provides that the actuating piston itself is employed as the valve stop in both the open and closed positions of the valve. Thus, it will hereinafter be appreciated that with such arrangement, no piston force is transmitted to the valve stem or closure member or to the actuating and closure parts related thereto due to the application of any excess fluid pressure in the actuator fluid supply lines accidentally or otherwise incurred.

It is a further object at all times that the said personnel charged with the operation of the valve is familiar with the true position of the valve closure member by a unique visual means employed in addition to the simple and accurate means of adjustment employed.

Other objects and advantages of the unique valve actuating mechanism and indicator means will become more readily apparent upon proceeding with the following description read in light of the accompanying drawings, in which:

FIG. 4 is a side view of the actuating mechanism shown in FIG. 2;

FIG. 5 is a magnified fragmentary sectional assembly view of the actuating mechanism shown in FIG. 4, with the valve indicated as being in the seated position shown in FIG. 1;

FIG. 6 is a magnified view of the novel instruction plate for attachment to the valve actuating mechanism and preferably used as the visual means whereby to indicate and provide means to adjust the valve actuating mechanism when seating or closing the valve;

FIG. 7 is a fragmentary sectional view of the actuating mechanism referred to in FIG. 5, but with the valve indicated as being in the fully open position; and FIG. 8 is an enlarged view of the novel instruction plate employed with actuating the valve to its fully open position.

Similar reference numerals refer to similar parts throughout the several views.

Figure 1:
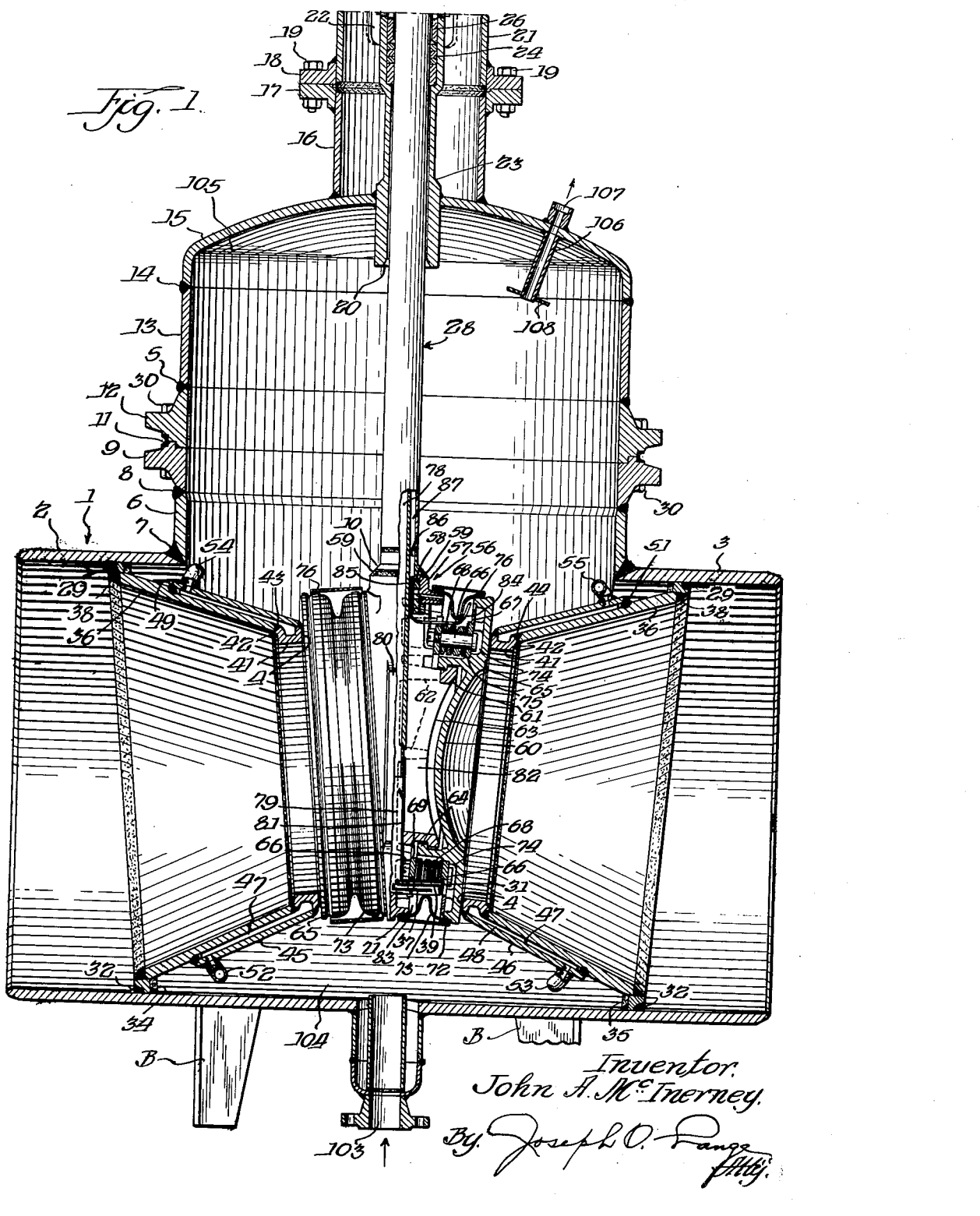
FIG. 1 is a fragmentary sectional assembly view of a gate valve for which my invention is adapted.

Referring now to FIG. 1, it should be understood from the beginning that the particular valve casing closure member, seats and stem illustrated and described herein are not a part of this invention, but are understood as being the invention of another, or others, and therefore expressly disclaimed. The valve body or casing generally designated 1 is shown and is preferably, although not necessarily, indicated as being of the fabricated type, consisting of the end connecting portions 2 and 3 for attachment to a pipe line (not shown). It may frequently be provided with supporting legs B. The elements 2 and 3 may, of course, be formed in a casting, or in a single piece of tubing or they may be made in split sections or halves. Preferably for connection to the usual pipe line (not shown), the annular weld attachment may be made in the usual manner to the said pipe line. The upper portion of the body 1 is provided with an annular neck 6, extending from the body opening as shown, and welded annularly by means of the weld 7. At its upper limit, a second annular weld 8 is provided for attachment of a connecting end flange 9 arranged in fluid sealed connection as at 11 to the annular bonnet flange 12 of the fabricated bonnet generally designated 13 and welded thereto as indicated at 5 to cooperate with an additional weld connection 14 receiving the cover 15. The said cover member supports a stuffing box enclosure 16 having an upper welded flange 17 for supporting in fluid tight relation the bolted bolt 18 attached by means of the flange 19 to the flange 17. Bolts 30 hold the respective connecting flanges 9 and 12 together in fluid tight relation as indicated. The numeral 20 denotes the backseating stop for the stem contact 10 when the valve is in the wide open position and having in mind particularly the part such stops play in connection with the actuating mechanism and its control features forming the subject matter of this invention.

Figure 2:
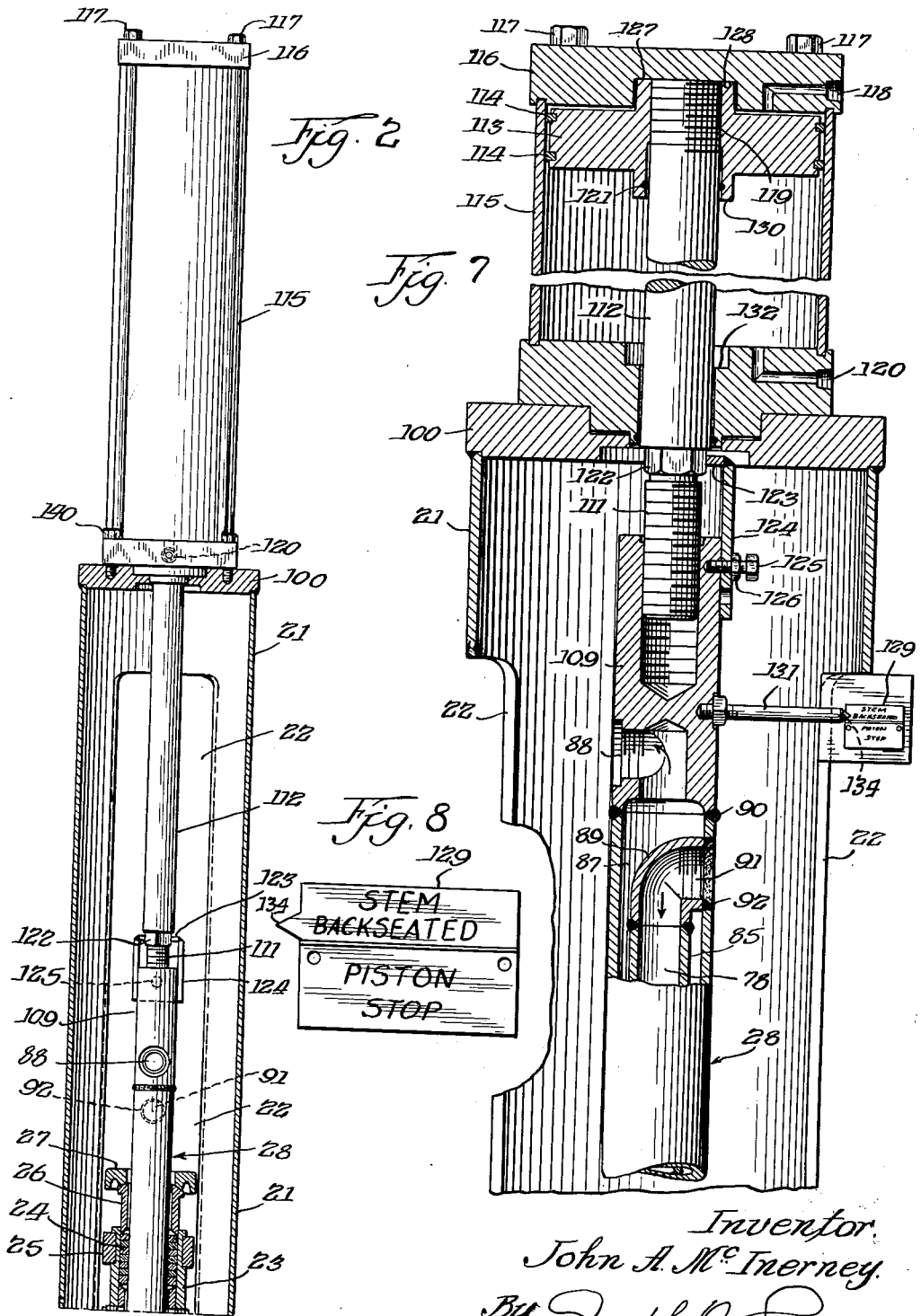
FIG. 2 is a fragmentary sectional assembly view of the upper portion of the actuating mechanism preferably used.

In weld sealed attachment to the flange 18, the vertically extending cylindrical housing or yoke 21 is provided with the oppositely disposed side openings 22 (only one of which is shown) to receive, as more clearly shown in FIG. 2, a conventional valve stem stuffing box 23 for retaining the packing 24 and provided with the usual split gland support 25 held in the recess of the member 23 as shown. The gland 26 and the gland flange 27 receive the longitudinally movable hollow valve stem generally designated 28, which latter member is made hollow for reasons and in a manner hereinafter explained in greater detail.

Now directing attention again to FIG. 1, the ports of the valve body 1 are provided with the inclined annular base portions 29, 29 at each inner end portion preferably annularly welded as at 32 to the inner peripheral surface of the valve body ports as shown. The annular welds are also applied on the inner sides of the members 29 as at 34 and 35 for attachment of the frusto-conical valve seat members 36 inclined and attached as at 38 to the said ring base members 29.

At the upper end portion of the frusto-conical seat rings 36, the annular ported contact portions 41 are annularly welded as at 42 to the said frusto-conical rings. At an outer peripheral portion for the length of the members 36 and preferably a frusto-conical configuration coinciding with that of the members 36, outer jacketed portions 45 and 46 are applied thereto and mounted in the usual annularly spaced-apart relation to the members 36 and 37 to form the indicated frusto-conical chambers 47. Annular welds provide the means of fluidtight attachment to the members 36 as at 49 and 51. For purpose of introducing cooling fluids into the jacketed portion formed by the chambers 47 and 48 suitable inlet connections 52 and 53 are provided preferably extending through the side wall of the casing members 2 and 3 so as to allow for connection to a suitable source of supply and circulation of heat exchange media (not shown).

To allow for thorough circulation of the cooling (or a heating) fluid, outlet connections as at 54 and 55 are provided in relation to the casing portions 2 and 3 in the same manner as described for the inlets 52 and 53. These outlets preferably discharge into a sump or other suitable discharge after the introduced fluid has completed its function as a heat exchange medium.

It is important to understand that a resilient disc or closure member is in contemplation when considering the significance of this invention.

In order to provide the desired resiliency when the gate valve is seated with relation to the annular valve seat contact surfaces 4 as illustrated in FIG. 1, it has been found desirable to make the valve closure member, generally designated 56, hollow and to a slight degree expansible in addition to possessing the property of resiliency. Thus, in making the closure member 56 hollow, provision is thereby provided for cooling (or heating) by means of the circulation of a suitable heat exchange medium such as water or even certain gases, if desired.

The valve gate closure member generally designated 56 preferably consists of a center connection or crosshead ring member 57 having a central hollow portion 58 for weld attachment at 59 to the outer weld connection 10 of the stem 28. The said center gate member 57 has a central annular hub 61 with a dome portion 60 and with relieved peripheral areas forming what is termed a bayonet connection for attachment upon suitable rotation to the ribs 62. The ribs 62 of said ring portion 57 are formed with an outer hollow surface 63 for abutting under the rare condition of maximum compression the inner surface of the dome 60 when the seat contact surface 65 abuts the seat ring surface 4.

Suitable annularly spaced-apart bolts 66 hold the member carrying the seat contact portion in shouldered relation to the annular plate 67 fixedly attached to the said contact member 65 to allow for the desired degree of resiliency of the valve closure member 56. The interposed composition washers 68 are mounted around the bolts 66 and held in shouldered relation to the inner annular plate 69 to impart such resiliency as referred to. Around the periphery of the central holder member 57, as at 71, and also around the periphery as at 72 of the seat contact member 65, a flexible bellows 73 is mounted in fluid sealing relation to both of the said members. It will thus be apparent that as the disc 56 is caused to expand outwardly the composition rings 68 will be compressed, the bolt heads moving axially under such conditions within the annular chamber 74 and being held against outward movement by the fixed plate 75. In some installations, radiation prevention rings 76 are mounted and connected so as to encompass the respective bellows 73. The valve closure member 56 in the course of its reciprocal movement is guided by its side disposed ribs 80 engaging suitably slotted guides (not shown) in the casing 1.

It will be apparent that by virtue of the said bellows being mounted in fluid sealed attachment as described, the circulation of a cooling (or heating) medium within the hollow valve closure member is provided. The heat exchange circulation is accomplished because the stem 28, as previously stated, is hollow for a substantial portion of its length. It has an inlet passage 78 which communicates with the lower chamber 79 within the gate closure member 56 having at one end the lower vertical screen portion 81 and thence into the chambers 82 defined by radial ribs 62 to enter the annular chamber 83 moving annularly upwardly into the tubing 84. The latter tubing is positioned on the outside wall of the inner stem portion 85 and within the discharge passage 86 connecting with the annular passage 87, discharging at an upper welded end 90 of the hollow stem 28 through the outside connection to discharge opening 88, as shown in FIG. 5. In considering this figure, it now will be apparent that the heat exchange inlet connection with the hollow stem inner tubing 85 is accomplished by means of the elbow 89 having its inlet connection with the stem as at 91 and being welded into position as illustrated for attachment to a suitable source of supply of the heat exchange media desired.

Figure 3:
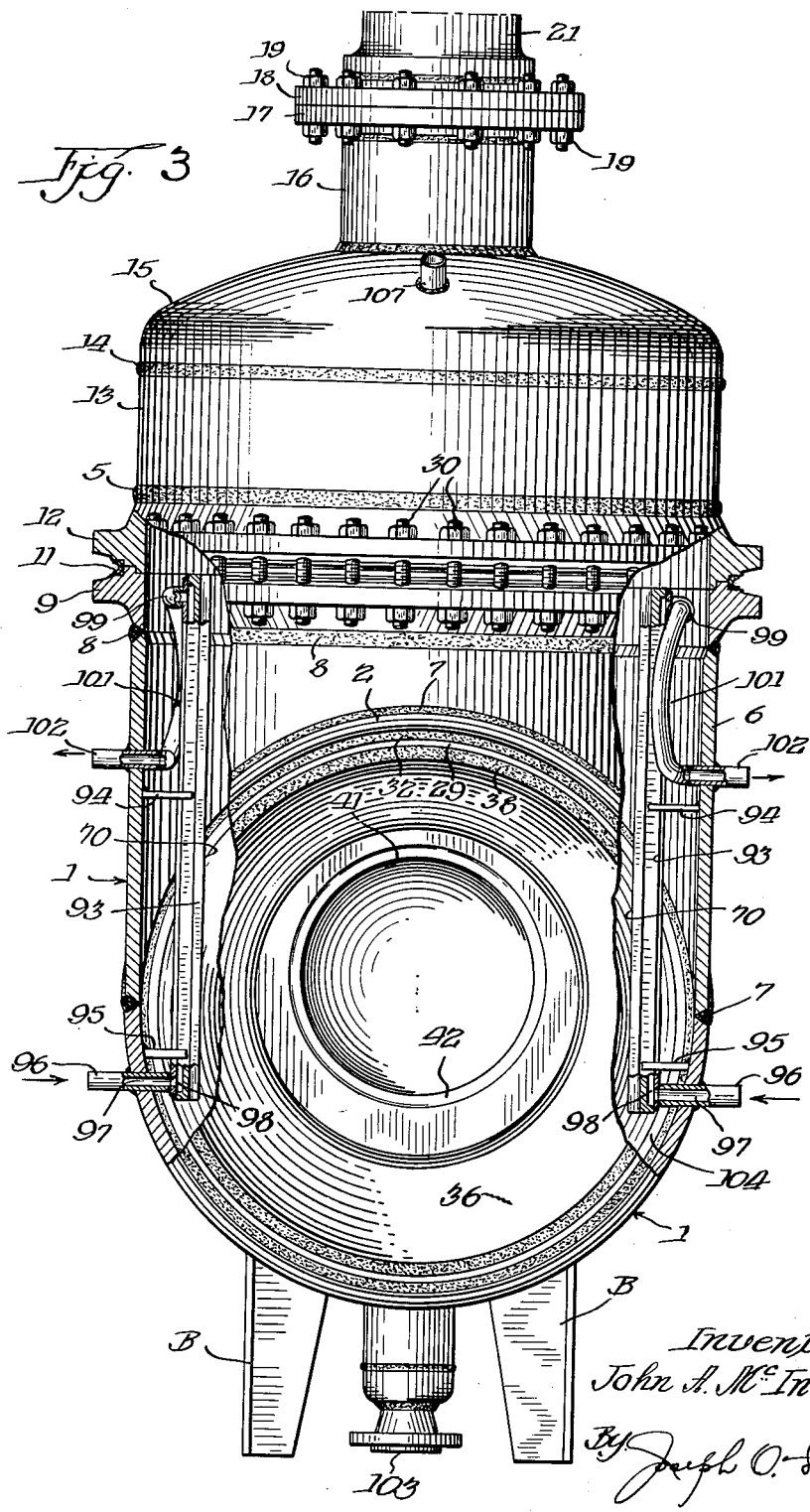
FIG. 3 is a fragmentary sectional assembly end view of the valve referred to in FIG. 1.

As more clearly shown in FIG. 3, the side disposed guides 93 in the casing 1 for cooperation with the closure guides 80 are preferably made hollow and are welded in position in said casing by means of the respective upper and lower struts 94 and 95. Thus, provision is made permitting the use of an inlet supply 96 permitting the cooling fluid to enter the passages 97 and 98 moving upwardly to the discharge elbows 99, downwardly through the tubing 101 and the discharge conduit 102. For each of the guides, it is preferable to have a separate set of fittings and a source of supply of the cooling medium to allow for the most efficient heat exchange taking place.

It will now be apparent that the valve closure member 56, the valve stem 28 and the valve seat rings 36 are adequately cooled by means of circulating a heat exchange medium. Similarly, if desired, as shown in FIG. 1, the valve body may be flushed or purged by means of a lower connection, as at 103, between the base supports B, in which such purging fluid is introduced into the valve body lower chamber 104 and thence moving upwardly, around the valve closure member, the seats and the stem into the valve bonnet chamber 105. It then discharges through the conduit 106 outwardly to any suitable discharge container or the like (not shown) connected by means of conduit as at 107. Preferably, although not necessarily, the conduit passage 106 may be provided with an annularly disposed baffle at 108. As previously stated, the description of the resilient hollow valve, stem and seats is for illustration only of one type of valve wherein easy overloading and damaging deformation could occur.

It will, therefore, be appreciated that the use of a hollow and an inherently resilient valve closure, such as the tapered gate member 56, requires, in the interest of the best and most desirable performance from the valve, for an actuating mechanism and the control therefor in which the stroke of the valve closure member, that is, from full open to full closed position and vice versa, is accurately and efficiently applied both at the factory testing and in the field later. Under the provisions of this invention, this is done by means of a novel fluid operated actuating mechanism, the details of which are more clearly shown in FIG. 7. It will be noted that the coupling member 109 containing the stem and gate cooling outlet 88 and welded as at 90 to the stem 28 has threadedly attached to it the lower threaded shank 111. The latter member is connected to the piston shaft 112, having at its upper end portion the piston 113 with the sealing rings 114, then operating within the cylinder 115. The said cylinder member is suitably capped at the upper portion by the bolted member 116 preferably held in place as at 117 and provided with the usual inlets 118 and 120 for actuating the piston 113. The said reciprocally movable piston 113 is attached to the shaft 112 by means of the threads 119, or any suitable means, being sealed, if desired, by the O-ring 121 in the depending boss 130. The described assembly of the cylinder, piston, and the cap is a conventional piston ring assembly. For example, one type is known to the trade as the "Miller" piston ring seal cylinder assembly. The external dimensions of the piston ring cylinders being identical with Miller standard hydraulic cylinders and the cup and ring type assemblies are interchangeable on all standard piston rods. The lower end portion of the cylinder which is provided with the fluid inlet supply connection 120 for the usual purpose, may also use said connection for a bleeder when desired.

For the purpose of locking the axial adjustment piston shank 111 in place, a hexagonal (or other polygonal) form locknut 122 is used extending within the open end recess of the extension 123. It is held in position against relative rotation, immediately upon determining proper adjustment of its axial threaded engagement with the coupling 109, as hereinafter described, by means of the fixed support 124. The latter member is firmly attached as at 125 by means of the threaded bolt and the locknut 126 to the coupling 109. However, only after adjustment has been made is the combined support and lock member 124 finally placed in the locked position as indicated.

The description immediately hereinafter following is concerned with the structure and functioning of the combined valve actuating and indicating means forming the subject matter of this invention.

Accordingly, attention is now directed to FIGS. 4, 5, and 6, which figures cover the assembly of the actuating piston and its cylinder together with the novel indicator and manual setting means for determining and then properly seating the resilient valve closure member 56 onto the body seat rings defined by the main valve annular surface 4. Let it further be assumed that the piston and cylinder, including its base or supporting flange 100 and the cylinder 115, have not yet been assembled with the valve yoke bracket 21.

The initial steps in any valve assembly are of course to thoroughly clean and inspect the disc faces and the valve stem throughout its entire length and this preliminary procedure is followed here. After such steps have been taken, the disc and stem assembly consisting of the members 56 and 28 respectively are carefully inserted into the valve casing 1 through the opening provided by the disassembly of the bolted connecting means at the flanges 9 and 12 and the seal 11. In view of the fact that the resilient closure member is necessarily relatively easily compressible under the high degree of flexibility provided by the bellows 73 and the mounting thereof, the resilient disc assembly 5 is allowed to seat of its own weight against the respective valve seat contact surfaces 4. Considering the cold or atmospheric temperature condition of the valve, the said disc is now in the desired seating position, with relatively little or no positive spring load outwardly being exercised or projected by such inherent resiliency of the closure member. At this stage, the next step is to attach the indicator rod plate 133 of FIG. 6 to the yoke bracket 21, in the same manner as shown in FIG. 5, and the assembly is then completed with relation to the yoke bracket 21 and the piston assembly on the valve. The indicator or stem pointer 131 is mounted in place as shown in FIG. 5, carefully noting that the said stem pointer is lined up accurately as illustrated in the same plane with the "0" inches as shown in FIG. 5. Thus, it should be clearly and readily apparent to the valve attendant that the valve closure member 56 is in the desired cold seating position. This is very important in obtaining the proper position of a resilient disc gate valve to avoid objectionable overload.

The next step is to remove the threaded shank portion 111 from the coupling 109 and with an eye bolt (not shown) threadedly attached instead to the open end of the coupling, the entire stem assembly 28 and the attached disc member 56 is lifted bodily out of the casing until the annular stem surface 10 abruptly contacts the annular bearing surface 20 of the stuffing box 23 thereby doing what is known to those skilled in the art as back-seating the stem. Actually, the stem surface 10 serves as a valve in preventing or minimizing line fluid leakage into the stuffing box 23 and past the packing 24.

At this stage of the valve setting operation, the upper indicating plate 129 of FIG. 8 is now ready for attachment to the yoke bracket 21 in the manner shown more clearly in FIG. 7. With the stem firmly held in the back-seated position above referred to, the plate 129 is now lined up with the indicator needle 131 so that it is exactly in the same plane as the pointed portion 134 on the side of the face plate at the forward end of the word "Back-seated." The plate is mounted firmly to the yoke bracket 21 only when this alignment of the pointer 131 with the pointed portion 134 of the plate 129 is established. The stem is now lowered into the body until, as previously provided, the stem indicator pointer 131 stops at "0" on the lower indicator plate 133. The eye bolt is removed and the cylinder assembly 115 is now attached to the valve by means of the flange 100 connected to the yoke bracket 21. The piston rod 112 is then threaded into the valve stem portion 109 until the piston annular surface 130 bottoms on the lower cylinder head which occurs when the said annular surface 130 makes abutting contact with the surface 132, as illustrated. With the latter position attained, the piston rod 112 and the piston 113 are now moved upwardly into the cylinder 115 for a predetermined distance (illustrated as 1½") with the disc seating now being coincident with the piston being bottomed as indicated on the plate 133. It will be noted that the instruction plate warning is given that the valve should not be so operated as to permit the valve disc 56 to be seated under a condition where it descends to the dimension indicated on the plate. It will be understood that at this stage, the piston locking arrangement previously described, as evidenced by the open angular member 123 engaging the locknut 122, is now assembled to lock the piston rod 112 to the valve stem portion 109, as illustrated more clearly in FIG. 5.

The valve is now ready to be opened by suitable fluid pressure applied to the piston 113. The valve is kept open in this position. The pointer 131 is carefully checked with respect to the accuracy of its transverse position considering the marking of the upper indicator plate 129. In this stage, the piston 113 will have attained the position of its uppermost travel to the extent that the surface 127 of the said piston makes abutting contact with the surface 128 of the cylinder cap 116, as illustrated in FIG. 7.

From the above description of the combined valve setting mechanism and visual indicator, it will now be clear that the valve movement can be accurately adjusted and closed with a considerable amount of fluid power insofar as applied pressure is concerned and the application of force to the piston 113. However, in view of the fact that both in the valve wide open position as well as in its closed position the limits of valve movement are effected predeterminately, the end applied impact is absorbed entirely by the piston stops 128 and 132 at their upper and lower cylinder ends respectively of the cylinder 115. No damage therefore can arise because of applying an overload to the valve closure member in seating the latter member nor to the valve seats 36.

It will be appreciated that throughout the above description, the reference to the means of attachment of the respective valve parts and actuating means has been indicated by welds, threads, or bolts. Obviously, other means of attachment may be made without affecting the scope of the invention.

It will therefore be understood that the particular embodiment above illustrated and described is for purposes of illustration only and not one of limitation.

I claim:

1. Indicator means for a rising stem valve or the like having a closure member and an axially movable operating stem, stem actuating means therefor provided with a fluid operated piston and cylinder, a threaded coupling adjustably attached to the stem actuating means, a pointer mounted on the stem transversely to the stem vertical axis, the said axial movement of the stem being responsive to the movement of the said piston in the cylinder, a plurality of indicator plate means in different planes cooperating with said stem and coacting with the said pointer to indicate the axial position of the said stem relative to the piston and also the position of the said closure member at both its full open and closed positions to permit axial adjustment of the stem relative to the said piston at said stem coupling, adjustment of the attachment portion of the said coupling providing for variations in the length of said stem whereby the said piston is bottomed in the cylinder when the said closure member is in a desired seating position in the valve.

2. In the method of accurately seating a fluid operated gate valve with a closure member having a resilient deflectable contact surface, the steps comprising the insertion of the closure member into the valve body and allowing it to seat of its own weight within the valve body, affixing an indicator pointer to the valve stem, attaching a lower indicator plate in alignment with the pointer, lifting the valve stem until it backseats, attaching an upper indicator plate in predetermined alignment with the pointer, lowering the valve stem into the valve body until the pointer stops at a predetermined location in relation to the lower indicator plate measured when the said closure member is seated by its own weight within said valve body, assembling the fluid operator assembly of a piston and cylinder on the valve, threading the piston rod into the valve stem until the piston is bottomed on the lower cylinder head, backing off the piston and rod a predetermined distance, and locking the piston rod to the valve stem.

3. A combined indicator and actuating means for a rising stem valve or the like having a resilient closure member and an operating stem therefor, stem actuating means comprising a piston and cylinder, the piston having a depending adjustable predeterminately rotatable connection with the said operating stem below the cylinder, a threaded coupling fixed to the said stem actuating means and cooperating with the said adjustable connection, a pointer mounted for axial movement with said stem, the said axial movement of the closure member being responsive to axial movement of the said piston within the cylinder, indicator plate means subsequently mounted in a plurality of planes coacting with the said pointer to indicate visually the position of the said resilient closure member at and between its open and closed positions, the said adjustable connection upon predetermined rotation providing for axial adjustment of the piston relative to the said stem and its endwise movement within said cylinder in both directions, whereby in seating the closure member predetermined limiting endwise movement of the piston against an end wall in the cylinder establishes in one direction the seated position of the closure member.

4. In a method of seating a piston actuated reciprocally movable valve closure member with a stem and having a resilient and limitedly deflectable seat contact surface in a valve body, the steps including the insertion of the valve closure member into the valve body to seat of its own weight therewithin, assembling an indicator pointer on the stem, assembling a lower indicator plate on the valve yoke, lifting the stem and valve closure member until the stem backseats, assembling an upper indicator plate to the valve yoke and lining up the said pointer with marking on the upper indicator plate denoting the stem backseated position, affixing the upper indicator plate to the yoke, lowering the stem and closure member into the body until the stem indicator pointer stops at a predetermined marking on the lower indicator plate, the latter marking and positioning of the stem stop indicating that the closure member is seated in substantially atmospheric temperature condition and substantially without load arising from resilience of said closure member, assembling the piston actuated cylinder to the yoke, threading the piston rod into the valve stem until the piston is bottomed on the lower cylinder head, then backing off the piston and rod a predetermined distance and locking the stem and piston rod connection.

5. In a gate valve actuating mechanism with an indicator therefor, the combination including a valve body and a yoke therefor, the body having a valve chamber, a valve closure member reciprocally movable in the valve chamber, seats for the valve closure member defining the inner end limits of the valve chamber, a stem for actuating the said valve closure member, stem actuating means outside of the yoke adjustably connected to the said stem to permit predetermined rotation, the said valve actuating means including indicating means, the said indicating means including a pointer and superposed indicator plates, a fluid actuated reciprocally movable piston and a cylinder for said actuating means, the said piston having at its end limits oppositely disposed shoulder portions within the cylinder serving as stop means for limiting the reciprocal movement of the valve closure member and defining the limits of axial movement of the stem in both opening and closing limits of movement of the said valve closure member, the pointer and indicator plates cooperating with the adjustable portion of the said actuating means to ultimately establish the final seating and full open position of the said closure member.

6. The combination in a gate valve, a valve actuating means therefor, a valve body and a yoke therefor, the body having a valve chamber, a valve closure member with resilient seat faces and reciprocally movable in the valve chamber, seats for the valve closure member seat faces and defining the inner end limits of the valve chamber, a stem for actuating the said valve closure member, valve actuating means on the yoke bonnet adjustably connected to the said stem to regulate combined overall axial length of the stem and actuating means, the said valve actuating means including a fluid actuated reciprocally movable piston and a cylinder therefor, the said piston and cylinder predeterminately serving as stop means for the valve closure member to define the limits of movement in both opening and closing directions of the said valve closure member, a pointer movable with the stem, a pair of indicator means adjustably positioned in separate planes on the yoke cooperating with said pointer at said limits of movement of the valve closure member, a rotatable screw coupling joining opposed ends of the said stem and actuating means, the said coupling being axially movable relative to the said stem upon predetermined rotation of said coupling, means on the stem for locking the said screw coupling against rotation, the said stem having a shoulder portion annularly disposed thereon cooperating with an annular shoulder portion in the yoke in the valve open position, and, with said screw coupling means, for establishing the axial position of the piston within the cylinder at its limit of upward movement in relation to the contact being effected between said shoulder portions.

References Cited in the file of this patent

UNITED STATES PATENTS

| | | |
|---|---|---|
| 2,110,859 | Goehring | Mar. 15, 1938 |
| 2,456,403 | Goehring | Dec. 4, 1948 |
| 2,584,847 | Dahl | Feb. 5, 1952 |
| 2,608,211 | Thorburn | Aug. 26, 1952 |
| 2,638,124 | Nickerson | May 12, 1953 |
| 2,868,495 | Lucas | Jan. 13, 1959 |

FOREIGN PATENTS

| | | |
|---|---|---|
| 506,418 | Canada | Oct. 12, 1954 |